US011873129B2

(12) United States Patent
Takami

(10) Patent No.: US 11,873,129 B2
(45) Date of Patent: Jan. 16, 2024

(54) PRINTING APPARATUS

(71) Applicant: Seiko Epson Corporation, Tokyo (JP)

(72) Inventor: Toru Takami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

(21) Appl. No.: 17/379,114

(22) Filed: Jul. 19, 2021

(65) Prior Publication Data

US 2022/0024627 A1 Jan. 27, 2022

(30) Foreign Application Priority Data

Jul. 21, 2020 (JP) ................................ 2020-124506

(51) Int. Cl.

*B32B 41/00* (2006.01)
*B65C 9/18* (2006.01)
*B41J 15/16* (2006.01)
*B41J 3/407* (2006.01)
*B65C 9/00* (2006.01)

(52) U.S. Cl.

CPC ............ *B65C 9/183* (2013.01); *B41J 3/4075* (2013.01); *B41J 15/165* (2013.01); *B65C 2009/009* (2013.01)

(58) Field of Classification Search

CPC ............. B65C 9/183; B65C 2009/009; B65C 2009/0009; B65C 9/1865; B41J 3/4075; B41J 15/165; B41J 15/16

USPC .................... 156/60, 64, 350, 351, 378, 379

See application file for complete search history.

(56) References Cited

U.S. PATENT DOCUMENTS

2012/0274694 A1* 11/2012 Lawther ................ B41J 15/165 347/16
2019/0061388 A1* 2/2019 Kasai ...................... B41J 11/06
2020/0070548 A1 3/2020 Yamada

FOREIGN PATENT DOCUMENTS

JP 2020-033122 3/2020

* cited by examiner

*Primary Examiner* — Michael N Orlando
*Assistant Examiner* — Joshel Rivera
(74) *Attorney, Agent, or Firm* — WORKMAN NYDEGGER

(57) ABSTRACT

A printing apparatus includes a printing part configured to perform printing on a recording medium in which a label is attached to a backing sheet, transport rollers configured to sandwich and transport the recording medium, a peeling member configured to peel off the label from the backing sheet by bending the recording medium, and a tensioner configured to apply a tension in a direction opposite to a transport direction of the recording medium transported by the transport rollers to the recording medium, wherein, in the transport direction, the transport rollers are positioned downstream of the peeling member, and the tensioner is positioned upstream of the peeling member.

6 Claims, 4 Drawing Sheets

PRINTING APPARATUS

The present application is based on, and claims priority from JP Application Serial Number 2020-124506, filed Jul. 21, 2020, the disclosure of which is hereby incorporated by reference herein in its entirety.

BACKGROUND

1. Technical Field

The disclosure relates to a printing apparatus.

2. Related Art

Conventionally, there has been known a printing apparatus for performing printing on a recording medium in which a label is attached to a backing sheet. For example, a printing apparatus disclosed in JP-A-2020-33122 includes transport rollers which sandwich and transport a recording medium, a peeling member for peeling off a label from a backing sheet by bending the recording medium, and second transport rollers disposed downstream of the peeling member in a transport direction of the recording medium. The above-mentioned second transport rollers facilitate peeling off of the label from the backing sheet by pulling the recording medium toward a downstream side of the peeling member.

However, when the transport rollers are provided at a plurality of locations in the transport direction of the recording medium as in the case of the above-described known printing apparatus, there is a possibility that feeding accuracy of the recording medium is lowered due to the difference in transporting state among the plurality of transport rollers.

SUMMARY

To overcome the above-described drawback, according to an aspect of the disclosure, a printing apparatus includes, a printing part configured to perform printing on a recording medium in which a label is attached to a backing sheet, a transport roller configured to sandwich and transport the recording medium, a peeling member configured to peel off the label from the backing sheet by bending the recording medium, and a tensioner configured to apply a tension to the recording medium in a direction opposite to the transport direction of the recording medium by the transport roller, and in the transporting direction, the transport roller is positioned downstream of the peeling member, and the tensioner is positioned upstream of the peeling member.

DESCRIPTION OF EXEMPLARY EMBODIMENTS

Hereinafter, embodiments of the disclosure are described with reference to the accompanying drawings.

First Embodiment

Figure 1:
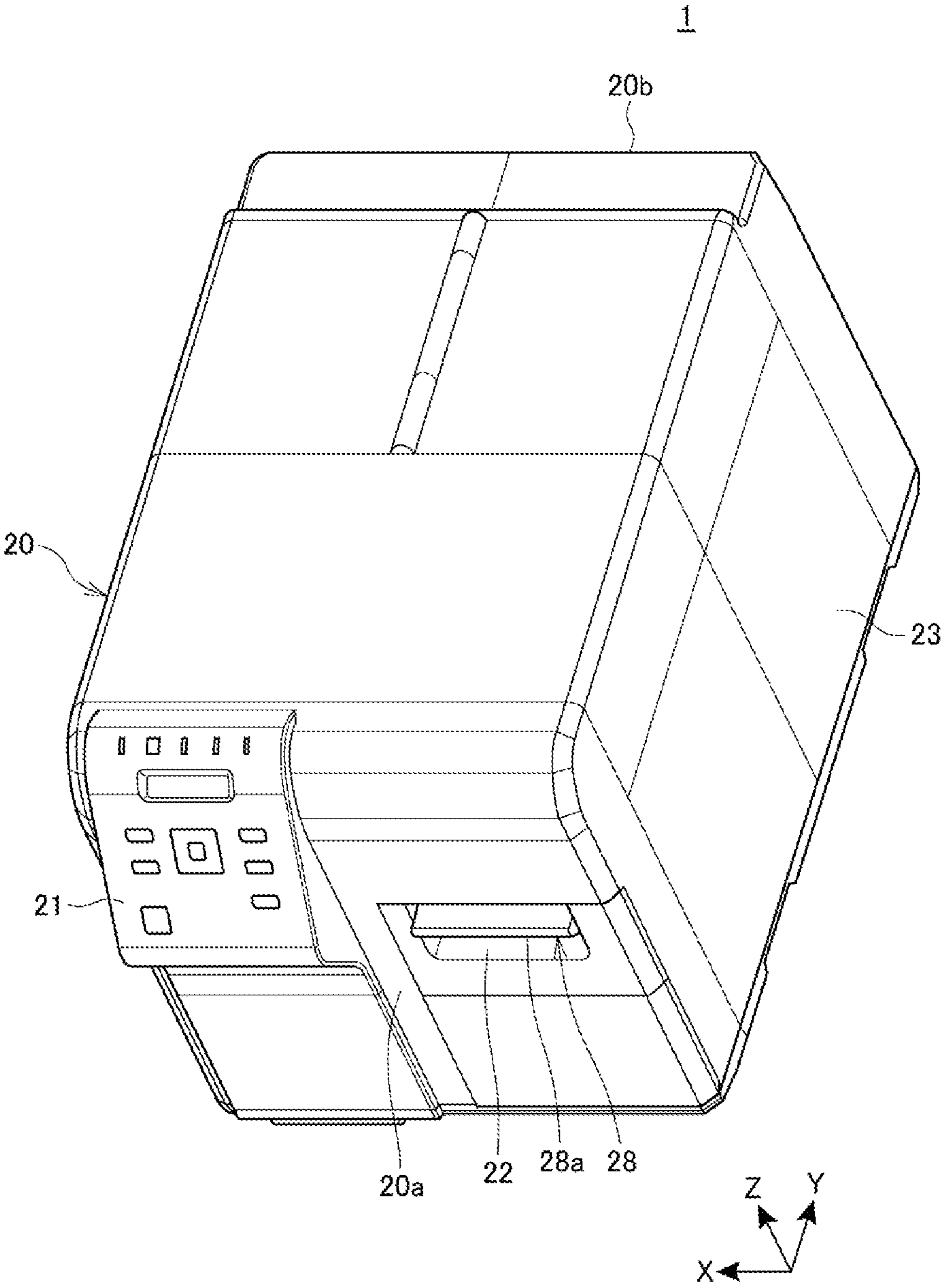
FIG. 1 is a perspective view illustrating an exterior of a printing apparatus.
Figure 2:
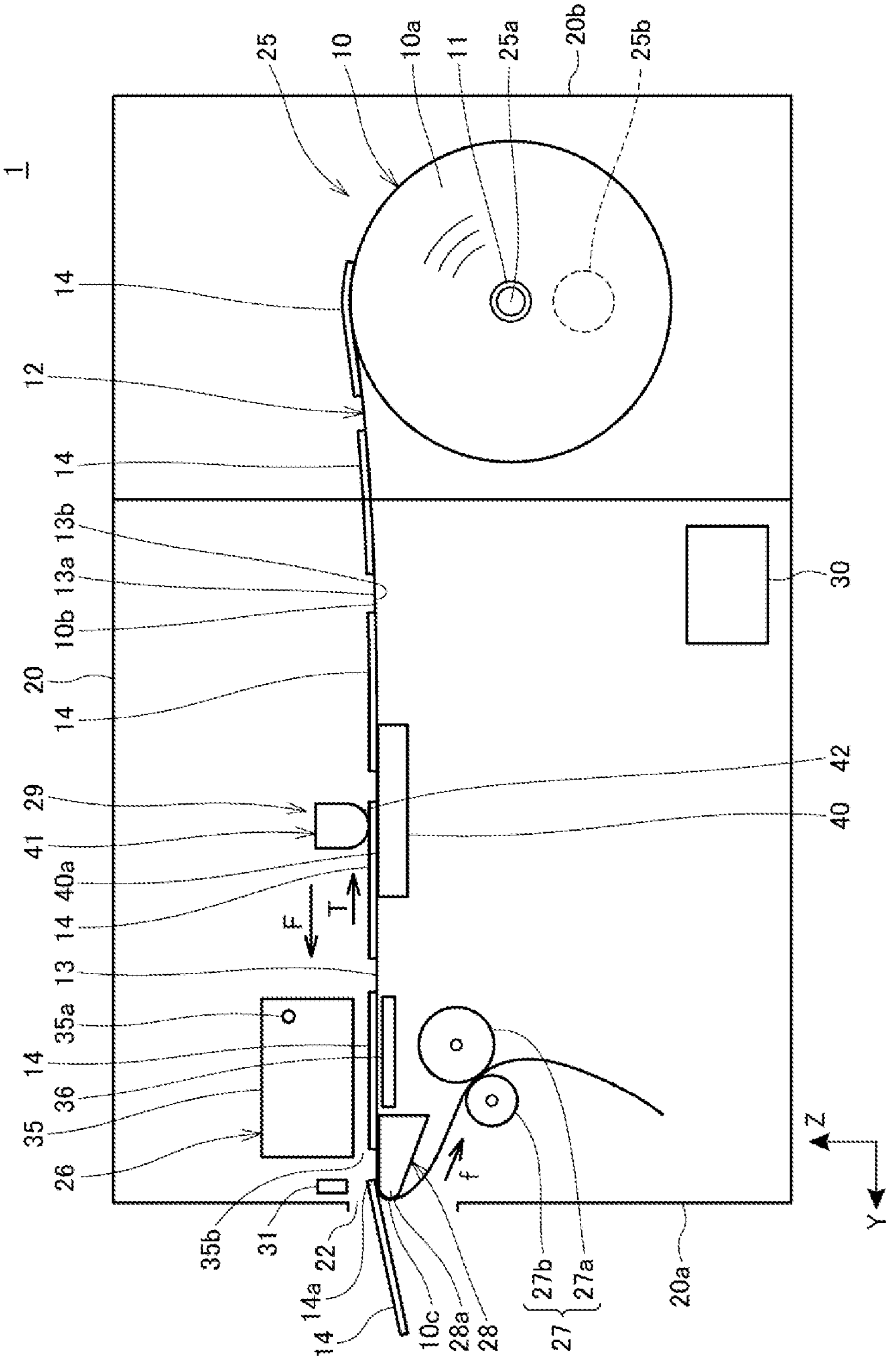
FIG. 2 is a cross-sectional view illustrating a configuration of the printing apparatus.

FIG. 1 is a perspective view illustrating an exterior of a printing apparatus 1. FIG. 2 is a cross-sectional view illustrating a configuration of the printing apparatus 1.

In the following description and drawings, a width direction of the printing apparatus 1 is defined as an X-axis direction, a depth direction of the printing apparatus 1 is defined as a Y-axis direction, and a vertical direction is defined as a Z-axis direction. The X-axis direction, the Y-axis direction, and the Z-axis direction are directions orthogonal to each other.

The printing apparatus 1 prints images and characters on a recording medium 10 based on printing data transmitted from an information processing device such as a personal computer and a mobile terminal.

The recording medium 10 is a roll sheet. For example, the recording medium 10 is formed by winding a label sheet 12 in a roll shape using a cylindrical core member 11 as the center of the roll.

The label sheet 12 includes a backing sheet 13 and a plurality of labels 14 attached to the backing sheet 13. The backing sheet 13 is a strip-shaped continuous sheet. The labels 14 are attached to a surface 13*a* of the backing sheet 13. The labels 14 are attached to the surface 13*a* substantially equidistantly in a length direction of the backing sheet 13.

A surface of the backing sheet 13 on a side opposite to the surface 13*a* is a back surface 13*b*.

The labels 14 are attached to the backing sheet 13 by an adhesive means and can be peeled off from the backing sheet 13.

A width of the recording medium 10 is a width of the backing sheet 13. A plurality of kinds of backing sheets which differ in width are provided for the backing sheet 13. Materials of the backing sheet 13 and the label 14, and the type of adhesive means are not particularly limited.

The printing apparatus 1 performs printing on the label 14. The label 14 subjected to printing is peeled off from the backing sheet 13 and is attached to an attachment target.

The printing apparatus 1 includes an outer case 20 having an approximately rectangular parallelepiped shape. An operating panel portion 21 where a display, operation buttons, and the like are arranged is disposed on a front surface 20*a* of the outer case 20. The front surface 20*a* of the outer case 20 constitutes a front surface of the printing apparatus.

A label ejection port 22 is formed on the front surface 20*a* of the outer case 20. The label 14 peeled off from the backing sheet 13 is ejected from the label ejection port 22 to the outside of the printing apparatus 1.

An openable and closeable roll sheet supply port 23 is formed in a side surface of the outer case 20. The recording medium 10 is set inside the printing apparatus 1 through the roll sheet supply port 23.

The printing apparatus 1 includes a recording medium feeding part 25, a printing part 26, transport rollers 27 for transporting the recording medium 10, a peeling member 28 for peeling off the label 14 from the backing sheet 13, and a tensioner 29 for applying a tension to the recording medium 10 inside the outer case 20.

The printing apparatus 1 includes a control part 30 which electrically controls the printing part 26, the transport rollers 27 and the like, and a sensor 31 which detects the label 14.

The control part 30 is a computer device including a storage part and a processor. The storage part includes memories such as read only memory (ROM) and random access memory (RAM). The above-described storage part stores a control program executed by the processor. The control program includes application programs. Further, the storage part stores data processed during execution of the computer program by the processor, and data of a result of processing.

The recording medium feeding part 25 is provided on a rear surface 20*b* side of the outer case 20 in the printing apparatus 1.

The recording medium feeding part 25 includes a recording medium mounting portion 25*a* on which the recording medium 10 is mounted, and a driving portion 25*b* which rotates the recording medium 10 by way of the recording medium mounting portion 25*a*.

The recording medium 10 is supported by the recording medium mounting portion 25*a* by inserting the recording medium mounting portion 25*a* into the core member 11.

The driving portion 25*b* is a motor driven by the control part 30. The driving portion 25*b* is connected to the recording medium mounting portion 25*a* by way of a plurality of gears, for example, and rotates the recording medium mounting portion 25*a*. The rotation axis of the recording medium 10 extends in a width direction of the printing apparatus 1.

The transport rollers 27 are provided on a front surface 20*a* side of the outer case 20 in the printing apparatus 1, and are positioned in the vicinity of the label ejection port 22.

The transport rollers 27 include a driving roller 27*a* and a driven roller 27*b* as nip rollers. The driving roller 27*a* and the driven roller 27*b* rotate about rotation axes extending in the width direction of the printing apparatus 1.

The driving roller 27*a* is rotatably driven by power of a drive source having a feed motor or the like. The feed motor is controlled by the control part 30.

The transport rollers 27 transport the recording medium 10 in a transport direction F by rotating in a state where the recording medium 10 is sandwiched between the driving roller 27*a* and the driven roller 27*b*.

The recording medium 10 is configured such that a roll portion 10*a* formed by winding the label sheet 12 in a roll shape is supported by the recording medium feeding part 25 disposed at a rear portion of the printing apparatus 1, and a strip-shaped portion 10*b* reeled out from the roll portion 10*a* is transported toward a front side by the transport rollers 27 positioned at a front portion of the printing apparatus 1.

That is, the transport direction F is a direction toward the front portion from the rear portion of the printing apparatus 1, and is the depth direction of the printing apparatus 1 when the printing apparatus 1 is viewed as a whole.

The driving roller 27*a* and the driven roller 27*b* are arranged such that rotation axes of the rollers are orthogonal to the transport direction F. The driving roller 27*a* is brought into contact with the back surface 13*b* of the strip-shaped portion 10*b* of the recording medium 10, and the driven roller 27*b* is brought into contact with the surface 13*a* of the strip-shaped portion 10*b*.

The printing part 26 includes a printing unit 35 and a platen 36 facing the printing unit 35. The printing part 26 is disposed upstream of the transport rollers 27 in the transport direction F. The printing part 26 is disposed on the front surface 20*a* side of the outer case 20 in the printing apparatus 1.

In a section defined between the roll portion 10*a* and the printing part 26, the recording medium 10 is transported in the transport direction F substantially horizontally in an orientation in which the surface 13*a* to which the labels 14 are attached forms an upper surface.

The printing unit 35 is disposed above the surface 13*a* and covers the label 14 from above.

The platen 36 is disposed below the strip-shaped portion 10*b* and receives the back surface 13*b* from below.

The printing unit 35 is supported by a carriage shaft 35*a* which extends in the width direction of the recording medium 10 orthogonal to the transport direction F. A main scanning direction of the printing unit 35 is equal to an axial direction of the carriage shaft 35*a*, and the printing unit 35 performs printing on the label 14 while moving along the carriage shaft 35*a* in a reciprocating manner. The main scanning direction and the width direction of the recording medium 10 are equal to the X-axis direction in FIG. 1.

The printing unit 35 is a serial type inkjet head and includes a nozzle row formed of nozzles corresponding to a plurality of colors. The printing unit 35 ejects inks supplied from respective ink cartridges not illustrated from nozzles of the nozzle row, and prints the inks onto the label 14 in accordance with a control performed by the control part 30.

The printing unit 35 may be a line type inkjet head which does not move in the above-described main scanning direction.

The peeling member 28 is positioned downstream of the printing part 26 and upstream of the transport rollers 27 in the transport direction F.

The transport rollers 27 are disposed below the printing part 26, and the recording medium 10 which has passed through the printing part 26 is bent downward and is transported toward the transport rollers 27 on the lower side by a feeding force f.

The peeling member 28 is positioned between the printing part 26 and the transport rollers 27 in the vertical direction. The peeling member 28 is brought into contact with the back surface 13*b* of the recording medium 10 in a section between the printing part 26 and the transport rollers 27 so as to bend the recording medium 10.

The peeling member 28 is a plate-shaped member. The peeling member 28 has a tip portion 28*a* directed from the inside of the printing apparatus 1 toward the label ejection port 22, and is brought into contact with the back surface 13*b* of the recording medium 10 by way of the tip portion 28*a*. The tip portion 28*a* is formed in an arc shape over the entire width direction of the recording medium 10 such that the tip portion 28*a* is brought into smooth contact with the back surface 13*b*.

The tip portion 28*a* of the peeling member 28 is positioned on a front surface 20*a* side of the outer case 20 with respect to the outlet 35*b* of the printing unit 35 for ejecting the recording medium 10 and the transport rollers 27.

The recording medium 10 ejected from the outlet 35*b* for the recording medium 10 is pressed by the peeling member 28 from a back surface 13*b* side so that the bent portion 10*c* is formed. The recording medium 10 is bent toward a rear and lower side of the printing apparatus 1 at the bent portion 10*c*, and advances toward the transport rollers 27. The bent portion 10*c* has an arc shape along the tip portion 28*a* of the peeling member 28.

When viewed in the axial direction of the transport rollers 27 as illustrated in FIG. 2, the recording medium 10 is bent at an acute angle at the bent portion 10*c*. At the bent portion 10*c*, the recording medium 10 is bent such that a surface 13*a* side of the recording medium 10 forms a peak, and a back surface 13*b* side of the recording medium 10 forms a valley.

Since the rigidity of the backing sheet 13 is lower than the rigidity of the label 14, at the bent portion 10*c*, only the backing sheet 13 is bent by the peeling member 28, and the label 14 is peeled off from the backing sheet 13. The peeled label 14 is ejected to the outside from the label ejection port 22.

The backing sheet 13 from which the label 14 is peeled off is transported toward the transport rollers 27. That is, the transport rollers 27 transport the recording medium 10 in the transport direction F in a state where the transport rollers 27 sandwich only the backing sheet 13.

The sensor 31 is disposed downstream of the printing part 26 and upstream of the peeling member 28 in the transport direction F. The sensor 31 is a reflective sensor, for example, and detects the label 14 on the backing sheet 13.

The tensioner 29 is positioned downstream of the recording medium feeding part 25 and upstream of the printing part 26 in the transport direction F.

The tensioner 29 includes a support portion 40 which supports the recording medium 10, and a pressing portion 41 which is contactable to and separable from the support portion 40.

The tensioner 29 applies a tension T in a direction opposite to the transport direction F to the recording medium 10 by sandwiching the recording medium 10 between the support portion 40 and the pressing portion 41.

Figure 3:
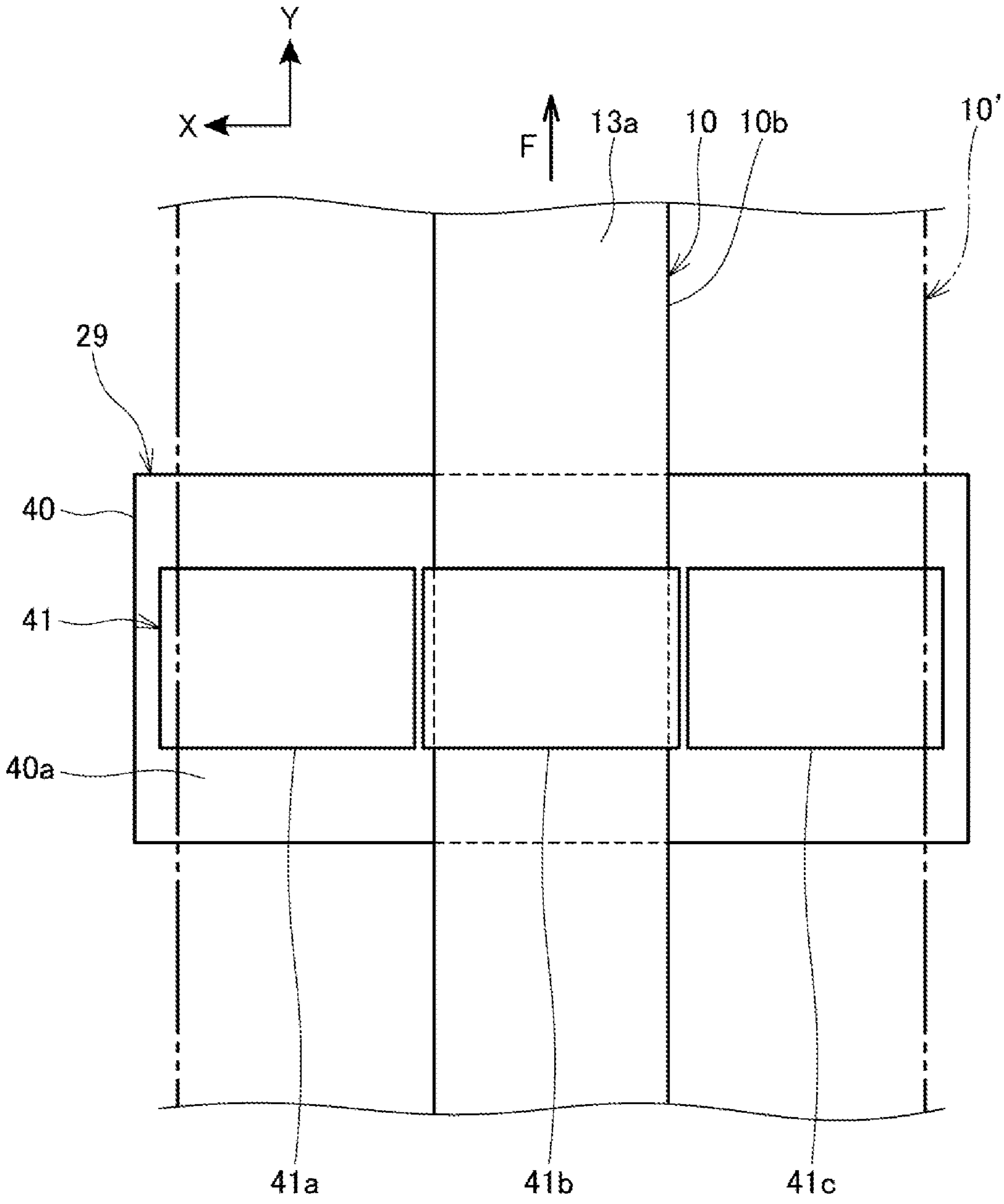
FIG. 3 is a plan view of a tensioner and a recording medium as viewed from above.

FIG. 3 is a plan view of the tensioner 29 and the recording medium 10 as viewed from above.

With reference to FIG. 2 and FIG. 3, the support portion 40 has a flat receiving surface 40*a* on an upper surface thereof. The support portion 40 supports the back surface 13*b* of the strip-shaped portion 10*b* of the recording medium 10 from below by the receiving surface 40*a*.

The pressing portion 41 is disposed so as to face the receiving surface 40*a* of the support portion 40, and is provided so as to be able to stroke in the vertical direction. The pressing portion 41 presses the surface 13*a* of the strip-shaped portion 10*b* of the recording medium 10 from above, and presses the recording medium 10 against the receiving surface 40*a*.

The pressing portion 41 is divided into a plurality of sections in the width direction of the recording medium 10. To be more specific, the pressing portion 41 includes a first pressing portion 41*a*, a second pressing portion 41*b*, and a third pressing portion 41*c* in order from one end side in the width direction of the recording medium 10.

Lower end surfaces of the first pressing portion 41*a*, the second pressing portion 41*b*, and the third pressing portion 41*c* form a pressing surface 42 which presses the surface 13*a* of the recording medium 10. When viewed in the axial direction of the transport rollers 27 as illustrated in FIG. 2, the pressing surface 42 is formed in an arc shape over the entire width direction of the recording medium 10. Accordingly, it is possible to prevent the pressing surface 42 from being caught by the label 14 on the surface 13*a*.

The first pressing portion 41*a*, the second pressing portion 41*b*, and the third pressing portion 41*c* are each biased by a biasing member not illustrated such that the pressing surface 42 is brought into contact with the recording medium 10. Accordingly, the first pressing portion 41*a*, the second pressing portion 41*b*, and the third pressing portion 41*c* are independently contactable to and separable from the support portion 40. For example, the biasing members are coil springs which press the first pressing portion 41*a*, the second pressing portion 41*b*, and the third pressing portion 41*c* downward respectively by way of upper surface portions of the first pressing portion 41*a*, the second pressing portion 41*b*, and the third pressing portion 41*c*.

The tensioner 29 generates a frictional force between the tensioner 29 and the recording medium 10 by sandwiching the recording medium 10 between the support portion 40 and the pressing portion 41. This frictional force is a force which acts in a direction so as to obstruct the transport of the recording medium 10 in the transport direction F, and this force generates a tension T in a direction opposite to the transport direction F.

The transport rollers 27 each have an axial length which enables the transport rollers 27 to transport the recording medium 10 and a recording medium 10' having the larger width than the recording medium 10. Further, the transport rollers 27 are capable of transporting a recording medium having an arbitrary width larger than the width of the recording medium 10 and smaller than a width of the recording medium 10'.

The width of the recording medium 10 is smaller than a width of the second pressing portion 41*b*. The width of the recording medium 10' is greater than the width of the second pressing portion 41*b*.

When the recording medium 10 is transported, the tensioner 29 generates a tension T by sandwiching the recording medium 10 between the second pressing portion 41*b* at the center in the width direction and the support portion 40.

When the recording medium 10' is transported, the tensioner 29 generates a tension T by sandwiching the recording medium 10' between the first pressing portion 41*a*, the second pressing portion 41*b*, and the third pressing portion 41*c* and the support portion 40.

In the transport direction F, the tensioner 29, the printing part 26, the sensor 31, the peeling member 28, and the transport rollers 27 are arranged in order from the recording medium feeding part 25 disposed on a most upstream side.

A printing operation of the printing apparatus 1 is described hereinafter.

The control part 30 of the printing apparatus 1 transports the recording medium 10 in the transport direction F by driving the transport rollers 27, and performs printing on the label 14 on the recording medium 10 by driving the printing unit 35 in the main scanning direction.

The control part 30 detects a width of a recording medium by a sheet width sensor not illustrated, and changes a transport force for the recording medium by the transport rollers 27 corresponding to the width of the recording medium. The control part 30 increases the transport force by the transport rollers 27 as the width of the recording medium increases. For example, the transport force is a torque of the transport rollers 27.

In the printing apparatus 1, the transport rollers 27 are disposed only at one position. Accordingly, feeding accuracy of the recording medium by the transport rollers 27 can be increased.

The recording medium 10 is pressed from above by the tensioner 29 so that the recording medium 10 is made to approach a platen 36 side in the printing part 26.

The transport rollers 27 transport the recording medium 10 in the transport direction F with a feeding force f against the tension T generated by the tensioner 29. With such an operation, the feeding force f and the tension T respectively act on front and rear sides of the bent portion 10*c* of the recording medium 10, and the bent portion 10*c* of the recording medium 10 is pressed against the tip portion 28*a* of the peeling member 28. Accordingly, the recording medium 10 can be effectively bent by the peeling member 28 so that the label 14 can be peeled off from the backing sheet 13.

In a step of peeling off the label 14, the control part 30 temporarily stops transporting by the transport rollers 27 and printing by the printing part 26 in a state where only the rear end portion 14*a* of the label 14 is attached to the backing sheet 13 as illustrated in FIG. 2. A user or the like peels off the label 14 from the backing sheet 13 by pulling the label 14 in which only the rear end portion 14*a* is attached to the backing sheet 13.

When the control part 30 determines that the label 14 is completely peeled off from the backing sheet 13 based on the detection by the sensor 31, the control part 30 restarts the transporting and the printing, and performs printing on the next label 14.

When the recording medium 10 is transported by the transport rollers 27, the control part 30 drives the driving portion 25*b* of the recording medium feeding part 25, and rotates the roll portion 10*a* of the recording medium 10 in the rotation direction corresponding to the transport direction F. To be more specific, the control part 30 rotates the roll portion 10*a* such that slack occurs in the recording medium 10 in a section between the roll portion 10*a* and the tensioner 29. Accordingly, a tension acting on the recording medium 10 in a direction opposite to the transport direction F due to the weight of the roll portion 10*a* can be reduced during the transport of the recording medium 10 by the transport rollers 27. As a result, the tension T can be easily controlled by the tensioner 29, and the label 14 can be favorably peeled off by generating the appropriate tension T.

In applying the tension T to the recording medium 10, although the tensioner 29 may be disposed between the peeling member 28 and the printing part 26 in the transport direction F, in the printing apparatus 1, the tensioner 29 is disposed upstream of the printing part 26 in the transport direction F. With such a configuration, the tensioner 29 sandwiches the recording medium 10 before printing and hence, there is no possibility that the tensioner 29 sandwiches the recording medium 10 after printing so that the printing on the label 14 can be maintained cleanly.

Further, by arranging the tensioner 29, the printing part 26, and the peeling member 28 in order from the upstream side in the transport direction F, the printing part 26 and the peeling member 28 can be disposed close to each other. As a result, printing and peeling off of the label 14 can be performed efficiently. For example, in a case that the printing part 26 is largely separated from the peeling member 28 toward the upstream side in the transport direction F, it is necessary to return a next label 14 to the position of the printing part 26 for performing succeeding printing after the label 14 is peeled off and hence, a distance that the recording medium 10 is transported in a direction opposite to the transport direction F is increased.

As has been described above, the printing apparatus 1 according to the first embodiment includes, the printing part 26 configured to perform printing on the recording medium 10 in which the label 14 is attached to the backing sheet 13, and the transport rollers 27 configured to transport the recording medium 10 in a state where the transport rollers 27 sandwich the recording medium 10. The printing apparatus 1 includes the peeling member 28 configured to peel off the label 14 from the backing sheet 13 by bending the recording medium 10, and the tensioner 29 configured to apply a tension T in a direction opposite to the transport direction F of the recording medium 10 transported by the transport rollers 27 to the recording medium 10. In the transport direction F, the transport rollers 27 are positioned downstream of the peeling member 28, and the tensioner 29 is positioned upstream of the peeling member 28.

Accordingly, the recording medium 10 is transported by the transport rollers 27 at one position downstream of the peeling member 28 and hence, the feeding accuracy of the recording medium 10 can be increased. Further, the tension T in the direction opposite to the transport direction F is applied to the recording medium 10 by the tensioner 29 positioned upstream of the peeling member 28 and hence, the label 14 can be favorably peeled off by the peeling member 28.

The tensioner 29 includes the support portion 40 which supports the recording medium 10, and the pressing portion 41 which is contactable to and separable from the support portion 40, and the tensioner 29 sandwiches the recording medium 10 between the support portion 40 and the pressing portion 41.

In this manner, the tensioner 29 sandwiches the recording medium 10 between the support portion 40 and the pressing portion 41 and hence, the tension T in the direction opposite to the transport direction F can be effectively applied to the recording medium 10. Accordingly, the label 14 can be favorably peeled off by the peeling member 28.

In the transport direction F, the printing part 26 is positioned upstream of the peeling member 28, and the tensioner 29 is positioned upstream of the printing part 26.

Accordingly, it is possible to protect the recording medium 10 to which the printing is applied by the printing part 26 from being sandwiched by the tensioner 29. In addition, the printing part 26 and the peeling member 28 can be disposed close to each other and hence, printing and peeling can be performed efficiently.

The tension T in the direction opposite to the transport direction F generated by the tensioner 29 is smaller than the transport force for transporting the recording medium 10 by the transport rollers 27.

Accordingly, the label 14 can be favorably peeled off using the tensioner 29, and the recording medium 10 can be transported by the transport rollers 27.

The printing apparatus 1 includes the control part 30 for controlling the rotation of the transport rollers 27, and the control part 30 is configured to detect the width of the recording medium 10 and is configured to increase the transport force generated by the transport rollers 27 as the width of the recording medium 10 increases.

Accordingly, even in a case that the tension T applied to the recording medium 10 by the tensioner 29 becomes large corresponding to the increase of the width of the recording medium 10, an appropriate transport force can be applied to the recording medium 10 by the transport rollers 27.

The recording medium 10 is a roll sheet, and is reeled out from the roll portion 10*a* in which the sheet is wound in a roll shape to the downstream side in the transport direction F by the transport rollers 27. The printing apparatus 1 is provided with the driving portion 25*b* configured to rotate the roll portion 10*a* in a direction corresponding to the transport direction F, and due to the rotation of the roll portion 10*a* by the driving portion 25*b*, the recording medium 10 between the roll portion 10*a* and the tensioner 29 is slackened.

Accordingly, by slackening the recording medium 10 between the roll portion 10*a* and the tensioner 29, a tension in a direction opposite to the transport direction F generated by the weight of the roll portion 10*a* can be reduced.

Therefore, it is possible to easily control a tension to be applied to the recording medium 10 by the tensioner 29.

The transport rollers 27 can transport a plurality of recording media 10 having different widths, and the tensioner 29 is divided into a plurality of sections in the width direction of the recording medium 10.

Accordingly, with respect to the tensioner 29 divided into a plurality of sections in the width direction, the tensioner located at a position corresponding to the width of the recording medium 10 functions as the tensioner and applies a tension to the recording medium 10. For example, in the case of the recording medium 10, the second pressing portion 41*b* functions as the tensioner, and in the case of the recording medium 10', the first pressing portion 41*a*, the second pressing portion 41*b*, and the third pressing portion 41*c* function as the tensioner. With respect to the tension T generated by the tensioner 29, a tension T generated in the case of the recording medium 10' is larger than a tension T generated in the case of the recording medium 10. That is, the tension T generated by the tensioner 29 changes corresponding to the width of the recording medium 10. Accordingly, the printing apparatus 1 can treat a plurality of recording media 10 having different widths with the simple configuration.

Second Embodiment

Next, a second embodiment of the disclosure is described with reference to the accompanying drawings. In the second embodiment, components having the same configurations as the corresponding components in the first embodiment are given the same symbols and the descriptions of these portions are omitted.

In the first embodiment, the description is made with respect to the configuration where the tensioner 29 is divided into a plurality of sections in the width direction of the recording medium 10. In the second embodiment, the description is made with respect to a tensioner 229 which is not divided into a plurality of sections in a width direction of a recording medium 10.

Figure 4:
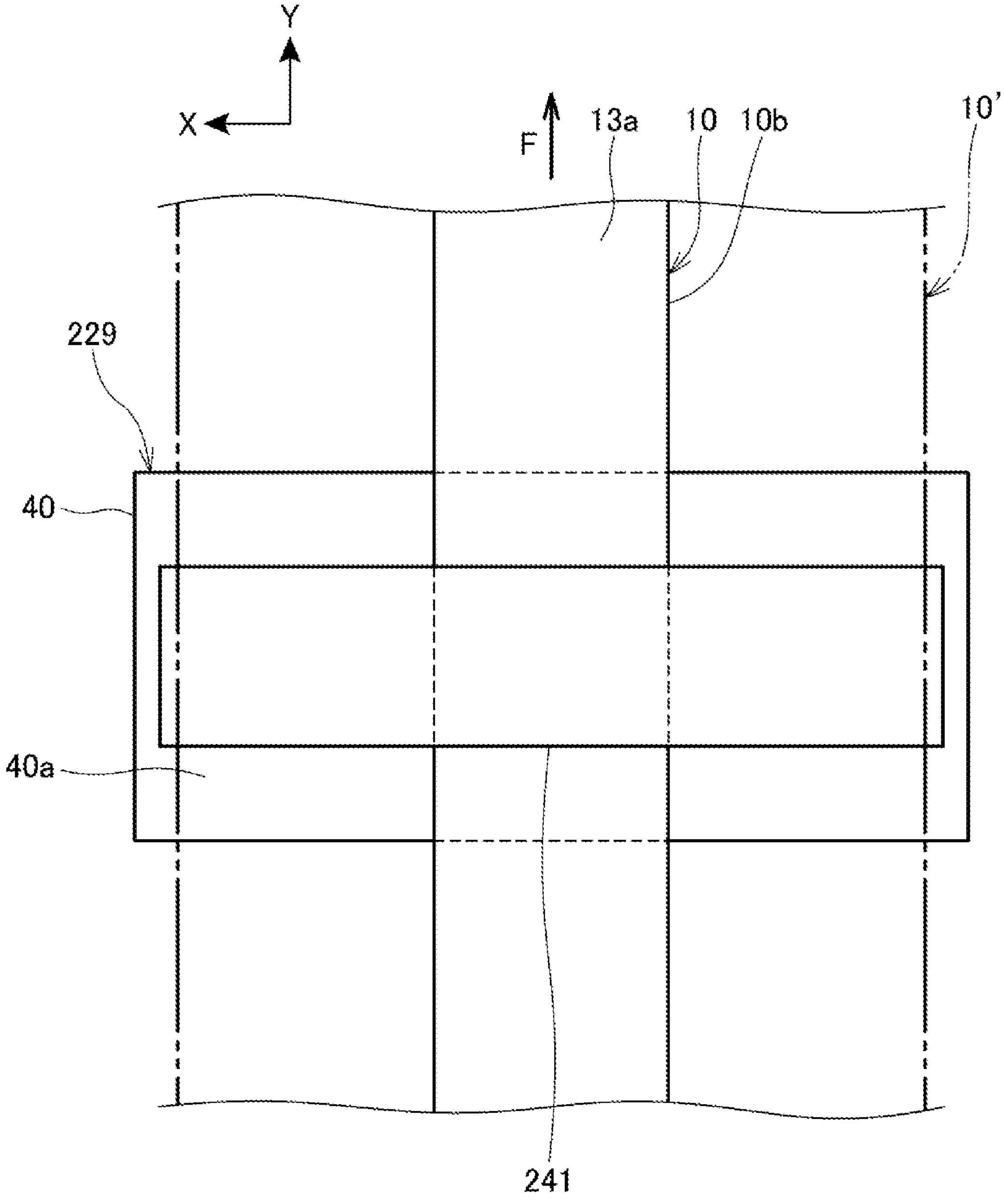
FIG. 4 is a plan view of a tensioner and a recording medium according to a second embodiment as viewed from above.

FIG. 4 is a plan view of the tensioner 229 and the recording medium 10 of the second embodiment, as viewed from above.

The tensioner 229 includes a support portion 40 and a pressing portion 241 which is contactable to and separable from the support portion 40.

The tensioner 229 applies a tension T in a direction opposite to a transport direction F to the recording medium 10 by sandwiching the recording medium 10 between the support portion 40 and the pressing portion 241.

The pressing portion 241 is disposed so as to face a receiving surface 40*a* of the support portion 40, and is provided so as to be able to stroke in the vertical direction. The pressing portion 241 presses a surface 13*a* of a strip-shaped portion 10*b* of the recording medium 10 from above, and presses the recording medium 10 against the receiving surface 40*a*.

The pressing portion 241 has a block shape which is continuously formed over the whole of a recording medium 10' in a width direction of the recording medium 10'. As viewed in a plan view, the pressing portion 241 extends in a direction orthogonal to the transport direction F. That is, the pressing portion 241 has a shape that the first pressing portion 41*a*, the second pressing portion 41*b*, and the third pressing portion 41*c* of the above-described first embodiment are integrally connected to each other in the width direction of the recording medium 10. The pressing portion 241 has a pressing surface 42 on a lower end surface thereof.

A control part 30 drives an actuator not illustrated so as to press the pressing portion 241 thus bringing the pressing surface 42 into contact with the recording medium 10.

The tensioner 229 generates a frictional force between the tensioner 229 and the recording medium 10 by sandwiching the recording medium 10 between the support portion 40 and the pressing portion 241. This frictional force is a force which acts in a direction so as to obstruct the transport of the recording medium 10 in the transport direction F, and this force generates a tension T in a direction opposite to the transport direction F.

The control part 30 changes the pressing force of the pressing portion 241 thus changing the tension by controlling a driving force of the above-described actuator.

The control part 30 detects the width of the recording medium 10 by a sheet width sensor not illustrated, and changes the tension T corresponding to the width of the recording medium 10.

The control part 30 increases the tension T as the width of the recording medium 10 increases. Accordingly, a label 14 can be peeled off by applying a tension T of an appropriate magnitude corresponding to the width of the recording medium 10.

When the recording medium 10' is transported, the control part 30 increases the tension T compared to a case that the recording medium 10 is transported.

The above-described embodiments are preferred embodiments of the disclosure. However, the disclosure is not limited to the embodiments, and various modifications are conceivable without departing from the gist of the disclosure.

In the above mentioned description, although the tensioner 29 is disposed upstream of the printing part 26 in the transport direction F, it is sufficient that the tensioner 29 be positioned upstream of the peeling member 28 in the transport direction F. For example, the tensioner 29 may be disposed between the peeling member 28 and the printing part 26 in the transport direction F.

In the above-mentioned description, although the control part 30 is configured to rotate the roll portion 10*a* by the driving portion 25*b* such that slack occurs in the recording medium 10 in the section defined between the roll portion 10*a* and the tensioner 29, the disclosure is not limited to such a configuration. For example, the recording medium 10 may be reeled out from the roll portion 10*a* by the transport force of the transport rollers 27 in a state where the roll portion 10*a* is supported on the recording medium mounting portion 25*a* in a rotatable manner without providing the driving portion 25*b*.

What is claimed is:

1. A printing apparatus comprising:

a printing part configured to perform printing on a recording medium in which a label is attached to a backing sheet;

transport rollers configured to sandwich and transport the recording medium;

a peeling member configured to bend the recording medium to peel off the label from the backing sheet; and a tensioner configured to apply a tension to the recording medium in a direction opposite to a transport direction of the recording medium by the transport rollers, wherein the transport rollers are positioned downstream of the peeling member in the transport direction, and the tensioner is positioned upstream of the peeling member, wherein the tensioner includes a support portion configured to support the recording medium, and a pressing portion which is contactable to and separable from the support portion, the support portion and the pressing portion being non-rotatable; and the tensioner sandwiches the recording medium between the support portion and the pressing portion.

2. The printing apparatus according to claim 1, wherein in the transport direction, the printing part is positioned upstream of the peeling member, and the tensioner is positioned upstream of the printing part.

3. The printing apparatus according to claim 1, wherein the tension in the direction opposite to the transport direction generated by the tensioner is smaller than a transport force for the recording medium by the transport rollers.

4. The printing apparatus according to claim 1 comprising a control part for controlling rotation of the transport rollers, wherein the control part is configured to detect a width of the recording medium, and is configured to increase the transport force generated by the transport rollers as the width increases.

5. The printing apparatus according to claim 1, wherein the recording medium is a roll sheet, and is reeled out by the transport rollers from a roll portion where the sheet is wound in a roll shape to a downstream side in the transport direction, a drive part configured to rotate the roll portion in a direction corresponding to the transport direction is disposed, and slack is imparted to the recording medium between the roll portion and the tensioner due to the rotation of the roll portion generated by the drive part.

6. The printing apparatus according to claim 1, wherein the transport rollers are configured to transport a plurality of the recording media having different widths, and the tensioner is divided into a plurality of sections in the width direction of the recording medium.

* * * * *